(12) United States Patent
Usami et al.

(10) Patent No.: US 6,210,840 B1
(45) Date of Patent: Apr. 3, 2001

(54) FLAME-RETARDANT ELECTROLYTIC SOLUTION AND NONAQUEOUS SECONDARY BATTERY CONTAINING THE SAME

(75) Inventors: Kyohei Usami; Miho Ito, both of Aichi-ken; Naohiro Kubota; Shinya Mashimo, both of Tokyo, all of (JP)

(73) Assignees: Denso Corporation, Aichi-Ken; Asahi Denka Kogyo Kabushiki Kaisha, Tokyo, both of (JP)

( * ) Notice: Subject to any disclaimer, the term of this patent is extended or adjusted under 35 U.S.C. 154(b) by 0 days.

(21) Appl. No.: 09/201,667

(22) Filed: Dec. 1, 1998

(30) Foreign Application Priority Data

Dec. 2, 1997  (JP) .................................................. 9-331538

(51) Int. Cl.$^7$ .................................................. H01M 10/26
(52) U.S. Cl. ...................................... 429/325; 429/231.95
(58) Field of Search .............................. 429/231.95, 199, 429/314, 325

(56) References Cited

U.S. PATENT DOCUMENTS 5,580,684    12/1996   Yokoyama et al. .
5,972,539  * 10/1999   Hasegawa et al. .................. 429/304

FOREIGN PATENT DOCUMENTS

| | | |
|---|---|---|
| 631 339 A2 | 12/1994 | (EP) . |
| 02-244565 | 9/1990 | (JP) . |
| 04-184870 | 7/1992 | (JP) . |
| 10-223257 | 8/1998 | (JP) . |
| WO 97/44842 | 11/1997 | (WO) . |

* cited by examiner

*Primary Examiner*—Maria Nuzzolillo
*Assistant Examiner*—Monique Wills
(74) *Attorney, Agent, or Firm*—Young & Thompson

(57) ABSTRACT

A flame-retardant electrolytic solution of an electrolyte salt in an organic solvent, wherein the organic solvent contains at least one phosphorus compound represented by formula (I) and a nonaqueous secondary battery containing the flame-retardant electrolytic solution.

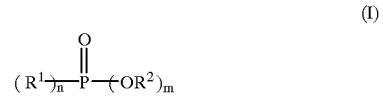

wherein $R^1$ represents an alkyl group having 1 to 8 carbon atoms, a halogenated alkyl group, an aryl group, an alkylaryl group, an aralkyl group or —$CH_2$—$COOR^3$; $R^2$ represents a methyl group, an ethyl group or a halogenated alkyl group having 1 to 8 carbon atoms; $R^3$ represents an alkyl group having 1 to 8 carbon atoms or a halogenated alkyl group; and m and n each represents 1 or 2 and the sum of m and n is 3.

8 Claims, 1 Drawing Sheet

FLAME-RETARDANT ELECTROLYTIC SOLUTION AND NONAQUEOUS SECONDARY BATTERY CONTAINING THE SAME

BACKGROUND OF THE INVENTION

1. Field of the Invention

The present invention relates to a nonaqueous electrolytic solution having high flame retardancy, and more particularly, to a flame-retardant electrolytic solution containing a phosphorus flame retardant having a specific structure and a nonaqueous secondary battery containing the flame-retardant electrolytic solution.

2. Description of the Related Art

In order to achieve size and weight reduction of portable equipment such as notebook computers, video cameras, and mobile phones, the need for secondary batteries having a higher energy density has been increasing. Further, development of batteries having a higher energy density than currently used lead batteries is also awaited for realizing practical use of electric automobiles which emit no air pollutant.

A lithium battery is known for its high energy density. A lithium battery usually contains a nonaqueous electrolytic solution of an electrolyte, such as $LiBF_4$, $LiPF_6$, $LiClO_4$, $LiAsF_6$, $LiCF_3SO_3$, $LiAlCl_4$ or $LiSiF_6$, in a mixed solvent comprising a high-dielectric constant solvent, such as propylene carbonate, y-butyrolactone or sulfolane, and a low-viscosity solvent, such as dimethoxyethane, tetrahydrofuran or 1,3-dioxolane.

These solvents used in the nonaqueous electrolytic solution are combustible and incurs a danger of fire in case of a short circuit, etc. A countermeasure against fire is indispensable particularly in a high-energy density battery because the high energy would be released all at once in case of a short circuit.

While fire caused by an overcharge, an overdischarge or an external short circuit has been avoided by an external safety mechanism, such an external safety mechanism does not work on a short circuit inside a battery. It has thus been demanded to develop a battery with safety independent on an external safety mechanism.

To make the solvent flame retardant is known as a means for ensuring the safety independently of the external safety mechanism. Addition of flame-retardant compounds, such as phosphoric esters and halogen compounds, to an electrolytic solution has been proposed to data. For example, Japanese Patent Laid-Open Nos. 184870/92, 283205/94, and 22839/96 teach addition of phosphoric esters, e.g., trimethyl phosphate and tricresyl phosphate. However, these compounds have turned out to cause reduction in charge and discharge efficiency or dendritical precipitation of lithium at the time of charges, making the batteries unsatisfactory for practical use.

Japanese Patent Laid-Open No. 244565/90 proposes use of a small amount of a phosphorus compound, such as a phosphate and a phosphonate, for the purpose of improving the penetrability of an electrolytic solution into a separator, in which no reference is given to the effectiveness of a phosphoric ester compound in improving the flame retardancy of an electrolytic solution.

SUMMARY OF THE INVENTION

An object of the present invention is to provide a flame-retardant electrolytic solution which exhibits excellent flame retardancy without adversely affecting the electrical characteristics.

Another object of the present invention is to provide a nonaqueous secondary battery containing the flame-retardant electrolytic solution.

As a result of extensive investigation, the inventors of the present invention have reached the findings that the above objects of the present invention are accomplished by adding a specific phosphorus compound to an electrolytic solution.

Completed based on the above findings, the present invention provides a flame-retardant electrolytic solution of an electrolyte salt in an organic solvent, wherein the organic solvent contains at least one phosphorus compound represented by formula (I):

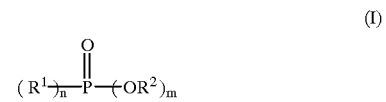

(I)

wherein $R^1$ represents an alkyl group having 1 to 8 carbon atoms, a halogenated alkyl group, an aryl group, an alkylaryl group, an aralkyl group or $—CH_2—COOR^3$; $R^2$ represents a methyl group, an ethyl group or a halogenated alkyl group having 1 to 8 carbon atoms; $R^3$ represents an alkyl group having 1 to 8 carbon atoms or a halogenated alkyl group; and m and n each represents 1 or 2 and the sum of m and n is 3.

The present invention also provides a nonaqueous secondary battery containing the above-described flame-retardant electrolytic solution.

The flame-retardant electrolytic solution according to the present invention provides a nonaqueous battery with high flame retardancy without adversely affecting the battery performance.

The nonaqueous secondary battery according to the present invention exhibits high flame retardancy as well as excellent battery performance.

DETAILED DESCRIPTION OF THE INVENTION

Figure 1:
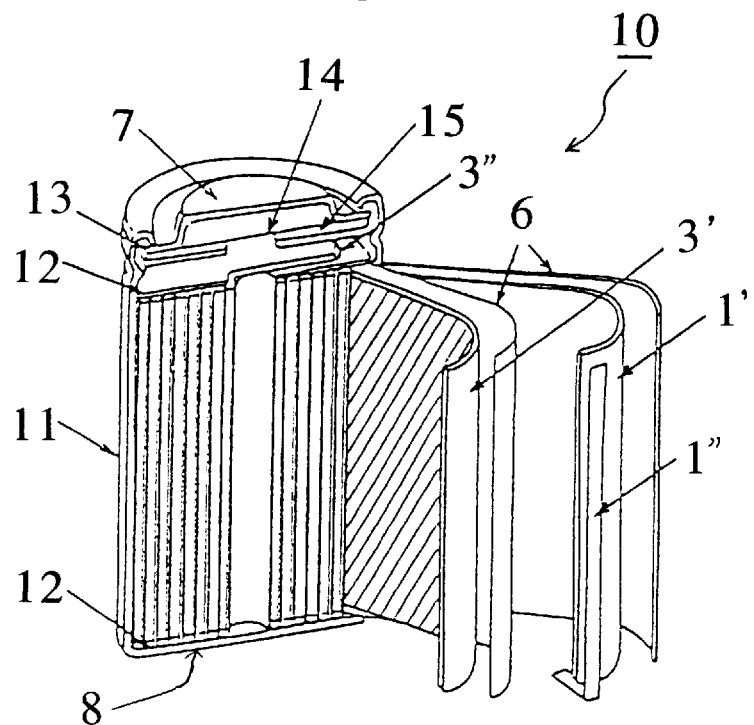
FIG. 1 is a perspective view of a cylindrical lithium secondary battery as an embodiment of the nonaqueous secondary battery according to the present invention, wherein the inside structure is shown as a cross section.

The phosphorus compound represented by formula (I) which can be used in the present invention serves as a flame retardant capable of imparting high flame retardancy to an electrolytic solution.

In formula (I), the alkyl group having 1 to 8 carbon atoms, as is represented by $R^1$ and $R^3$, includes straight-chain or branched alkyl groups, such as methyl, ethyl, propyl, butyl, hexyl, heptyl, octyl, isooctyl and 2-ethylhexyl groups. The halogenated alkyl group, as is represented by $R^1$, $R^2$ and $R^3$, include the above-enumerated alkyl groups with one or more hydrogen atoms thereof substituted with a fluorine atom and/or a chlorine atom and/or a bromine atom. Examples of such a halogenated alkyl group include straight-chain or branched perfluoroalkyl groups, e.g., perfluoromethyl, perfluoroethyl, perfluoropropyl, perfluoroisopropyl, perfluoropentyl, perfluorohexyl, perfluoroheptyl, and perfluorooctyl groups; 2,2,2-trifluoroethyl, 2,2,3,3,3-pentafluoro-n-propyl, 1H, 1H-heptafluoro-n-butyl, 6-(perfluoroethyl)-n-hexyl, 2-(perfluoro-n-butyl)ethyl, 3-perfluorobutyl-2-iodopropyl, 6-(perfluoro-n-butyl)hexyl, and 2-(perfluoro-n-hexyl)ethyl groups.

The aryl group as represented by $R^1$ includes phenyl and naphthyl groups; the alkylaryl group includes tolyl, p-butylphenyl, p-t-butylphenyl, and nonylphenyl groups; and the aralkyl group includes benzyl and phenethyl groups.

Specific but non-limiting examples of the phosphorus compounds represented by formula (I) are shown below.

No. 1: Dimethylmethane phosphonate

No. 2: Diethylmethane phosphonate

No. 3: Diethylethoxycarbonylmethyl phosphonate

No. 4: Dimethylethane phosphonate

No. 5: Dimethylbenzene phosphonate

No. 6: Dimethyl-α-toluene phosphonate

No. 7: Di-(2,2,2-trifluoroethyl)methane phosphonate

No. 8: Di-(2,2,2-trifluoroethyl)ethane phosphonate

No. 9: Di-(2,2,3,3,3-pentafluoro-n-propyl)methane phosphonate

No. 10: Dimethylperfluoroethane phosphonate

No. 11: Dimethylphosphinic acid methyl ester

No. 12: Dimethylphosphinic acid 2,2,2-trifluoroethyl ester

Of the above phosphorus compounds, those in which $R^1$ is an alkyl group are preferred for their low viscosity and excellent capability of dissolving an electrolyte. Further, those in which at least one of $R^1$, $R^2$, and $R^3$ is a halogenated alkyl group or m is 2 and n is 1 (phosphonate compounds) are preferred because they afford a nonaqueous secondary battery having an improved capacity retention (a percentage of the discharge capacity in the 100th charge and discharge cycle to that in the 2nd one; see Example described later).

The flame-retardant electrolytic solution according to the present invention is a solution of an electrolyte salt in an organic solvent containing at least one of the above-mentioned phosphorus compounds. The phosphorus compound per se can serve as a solvent for the electrolyte. In other words, the organic solvent of the electrolytic solution can totally be the phosphorus compound(s) of the present invention. Taking into consideration the excellent compatibility of the phosphorus compounds with other organic solvents, the phosphorus compound can be used as a mixture with other organic solvents to reduce the viscosity or improve the electrical conductivity of the electrolytic solution.

Any organic solvent that is generally employed in the electrolytic solution of conventional nonaqueous secondary batteries can be used with no particular limitation. Useful organic solvents include carbonate compounds, lactone compounds, ether compounds, sulfolane compounds, dioxolane compounds, ketone compounds, nitrile compounds, and halogenated hydrocarbon compounds. Specific examples of suitable organic solvents are carbonates, such as dimethyl carbonate, methylethyl carbonate, diethyl carbonate, ethylene carbonate, propylene carbonate, ethylene glycol dimethyl carbonate, propylene glycol dimethyl carbonate, ethylene glycol diethyl carbonate, and vinylene carbonate; lactones, such as 7-butyrolactone; ethers, such as tetrahydrofuran, 2-methyltetrahydrofuran, 1,4-dioxane, anisole, and monoglyme; sulfolanes, such as sulfolane and 3-methylsulfolane; dioxolanes, such as 1,3-dioxolane; ketones, such as 4-methyl-2-pentanone; nitriles, such as acetonitrile, propionitrile, butyronitrile, valeronitrile, and benzonitrile; halogenated hydrocarbons, such as 1,2-dichloroethane; methyl formate, dimethylformamide, dimethylthioformamide, and dimethyl sulfoxide. These solvents can be used either individually or as a mixture of two or more thereof. One or more than one solvent selected from the group consisting of carbonates, lactones, ethers, sulfolanes, and dioxolanes is preferred in terms of capability of dissolving an electrolyte, dielectric constant, and viscosity.

The proportion of the phosphorus compound in the organic solvent is preferably 5 to 100% by weight, particularly 10 to 100% by weight, more particularly 10 to 80% by weight. The phosphorus compound in a proportion less than 5% by weight tends to fail to achieve sufficient flame retardation.

The phosphorus compound is by no means limited by the process of synthesis. Any method of synthesis commonly used for organophosphorus compounds can be used.

The electrolyte salts which can be used in the present invention include organic or inorganic salts, such as $LiPF_6$, $LiBF_4$, $LiClO_4$, $LiAsF_6$, $CF_3SO_3Li$, $N(CF_3SO_2)_2Li$, $C(CF_3SO_2)_3Li$, $LiI$, $LiAlCl_4$, $NaClO_4$, $NaBF_4$, and $NaI$. Such inorganic salts as $LiPF_6$, $LiBF_4$, $LiClO_4$, and $LiAsF_6$, and such organic salts as $CF_3SO_3Li$, $N(CF_3SO_2)_2Li$, and $C(CF_3SO_2)_3Li$, are preferred for their excellent electrical characteristics.

The electrolyte salt is preferably dissolved in the organic solvent in a concentration of 0.1 to 3.0 mol/l, particularly 0.5 to 2.0 mol/l. If the concentration is lower than 0.1 mol/l, a sufficient current density cannot be obtained in some cases. Concentrations higher than 3.0 mol/l tend to damage the stability of the electrolytic solution.

The flame-retardant electrolytic solution of the present invention is prepared by dissolving the above-described electrolyte salt in a solvent comprising the phosphorus compound represented by formula (I) and, if desired, other organic solvents in a conventional manner.

The flame-retardant electrolytic solution according to the present invention is suitable for use as a nonaqueous electrolytic solution which constitutes a nonaqueous secondary battery described hereunder.

The nonaqueous secondary battery according to the present invention comprises a cathode, an anode, a separator, etc. as well as the flame-retardant electrolytic solution according to the present invention. The members other than the electrolytic solution are not particularly limited, and various materials customarily employed in the art are employable as described below.

The cathode active material making up the cathode includes $TiS_2$, $TiS_3$, $MoS_3$, $FeS_2$, $Li_{(1-x)}MnO_2$, $Li_{(1-x)}Mn_2O_4$, $Li_{(1-x)}CoO_2$, $Li_{(1-x)}NiO_2$, $V_2O_5$, and $V_6O_{13}$, wherein x represents a number of from 0 to 1.

The anode active material which makes up the anode includes metallic lithium, lithium alloys, inorganic compounds (e.g., tin compounds), carbonaceous materials, and electrically conductive polymers.

The separator is made of, e.g., a thermoplastic resin. Examples of useful thermoplastic resins include polyolefin resins, such as high-density polyethylene, low-density polyethylene, linear low-density polyethylene, polypropylene, polybutene-1, poly-3-methylpentene, and ethylene-propylene copolymers; fluororesins, such as polytetrafluoroethylene; polystyrene, polymethyl methacrylate, polydimethylsiloxane; and mixtures thereof Polyolefin resins are preferred for their moldability, chemical resistance, and mechanical strength.

The separator made of a thermoplastic resin can have a laminate structure composed of a low-melting thermoplastic resin film and a high-melting thermoplastic resin film or nonwoven fabric in order to prevent ejection of the battery contents or a burst of the battery due to short circuit-induced heat generation.

The nonaqueous secondary battery of the present invention is not limited in shape and can have any shape, such as a flat shape (button type), a cylindrical shape, a prism shape, and the like. A typical example of a cylindrical lithium battery is shown in FIG. 1, in which a cross section is depicted to show the inside structure. As shown in FIG. 1, a lithium secondary battery 10 comprises an anode sheet 1' made up of a current collector having an anode active material mixture on both side thereof, and a cathode sheet 3' made up of a current collector having a cathode active material mixture on both side thereof, with an electrolytic solution (not shown) filling the voids or gaps between the anode and the cathode.

The present invention will now be illustrated in greater detail with reference to Example, but it should be understood that the present invention is not construed as being limited thereto.

Figure 2:
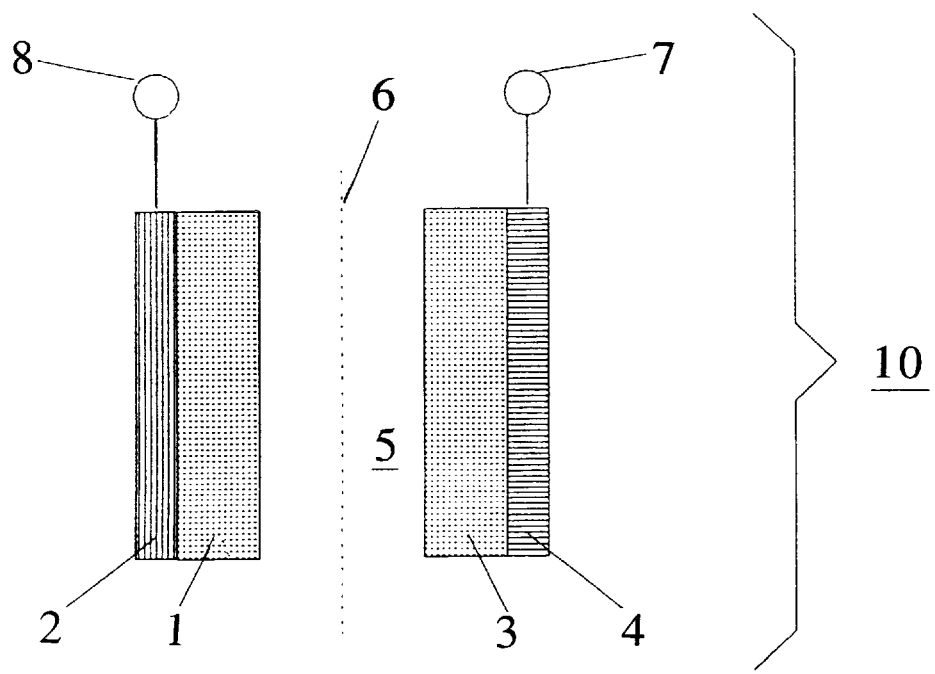
FIG. 2 is a schematic illustration showing the basic structure of the lithium secondary battery.

FIG. 2 schematically illustrates the basic structure of a lithium secondary battery in which the flame-retardant electrolytic solution is used.

The lithium secondary battery 10 shown in FIG. 2 basically comprises an anode 1 made up of at least lithium or a lithium alloy, an anode current collector 2, a cathode 3, a cathode current collector 4, an electrolytic solution 5, which is the flame-retardant electrolytic solution of the present invention, a separator 6, a cathode terminal 7, and an anode terminal 8. If desired, the battery 10 can have other members generally used in nonaqueous secondary batteries.

Since the lithium secondary battery shown in FIG. 2 contains the flame-retardant electrolytic solution of the present invention, which contains the phosphorus compound represented by formula (I), it has improved safety against fire of the electrolytic solution.

In a lithium secondary battery, a discharge reaction generally consists in dissolution of lithium ions of the anode active material into an electrolytic solution and concurrent incorporation of the lithium ions into the cathode active material. On the other hand, a charge reaction generally consists in incorporation of lithium ions present in the electrolytic solution into the anode active material. At this time, the lithium ions precipitate as metallic lithium and, at the same time, lithium ions of the cathode active material dissolve in the electrolytic solution. The precipitation of metallic lithium on the anode during the charge reaction is not uniform but local. The local precipitate (nucleus) grows dendritically in the electrolytic solution to form dendrite, which finally reaches the cathode to cause a short circuit, allowing a high current to flow in a very short time, which is apt to cause fire.

Even where the anode material is not metallic lithium or a lithium alloy but a substance capable of reversibly intercalating and disintercalating lithium ions, for example, a carbonaceous material, metallic lithium tends to precipitate on the surface of the carbonaceous anode material in case of an overcharge to provide a nucleus, from which dendrite may grow to cause a short circuit.

In such cases involving a danger of fire, addition of a conventional flame retardant, such as halogen compounds or phosphorus compounds other than the compounds of the present invention, is effective in suppressing fire of the electrolytic solution to some extent but not so sufficiently as can be seen effective in improving the battery safety.

To the contrary, the flame-retardant electrolytic solution according to the present invention, which contains the phosphorus compound represented by formula (I), is prevented from firing even where any anode active material other than lithium or a lithium alloy is used and is therefore effective in improving the safety of a battery.

The nonaqueous secondary battery according to the present invention is not limited to the above-described lithium secondary battery and is subject to appropriate structural variation without impairing the effects of the present invention.

Another example of the nonaqueous secondary battery according to the present invention which uses a carbonaceous material in the anode is described below. The effects observed in terms of flame retardancy and electrical characteristics, namely, charge and discharge efficiency, were measured and evaluated in accordance with the following methods, and the results obtained are shown in Table 1 below.

Evaluation on Flame Retardancy of Electrolytic Solution:

$LiPF_6$ was dissolved in a mixed organic solvent comprising ethylene carbonate (EC), diethyl carbonate (DEC) and the phosphorus compound shown in Table 1 at a weight ratio of 1:1:X (see Table 1) in a concentration of 1 mol/l to prepare an electrolytic solution. A strip of manila paper 15 mm wide, 320 mm long and 0.04 mm thick was dipped in the electrolytic solution and then hung vertically for 3 minutes to drip the excess of the solution. The impregnated manila paper was fixed horizontally on pins of a mount at 25 mm intervals. The mount was put in a metal box of 250 mm×250 mm×500 mm, one end of the strip was lit up with a lighter, and the burning rate (mm/sec) was measured to evaluate the flame retardancy of the electrolytic solution.

Preparation of Test Battery and Measurement of Charge and Discharge Efficiency:

A graphite carbon material having a true specific gravity of 2.20 g/cm$^3$ was ground to powder having an average particle size of 10 μm. Ninety parts (by weight, hereinafter the same) of the powdered graphite and 10 parts of polyvinylidene fluoride were mixed to prepare an anode material. The anode material was dispersed in N-methyl-2-pyrrolidone, and the resulting slurry was applied to both sides of 10 μm thick copper foil, dried, and compressed in a roll press to prepare an anode.

$LiCoO_2$ was ground to powder having an average particle size of 3 μm. Ninety-one parts of the powder were mixed with 6 parts of graphite and 3 parts of polyvinylidene fluoride to prepare a cathode material. The cathode material was dispersed in N-methyl-2-pyrrolidone, and the resulting slurry was applied to both sides of 20 μm thick aluminum foil, dried, and compressed in a roll press to prepare a cathode.

The cathode and the anode were combined with a 25 μm thick finely porous polypropylene film separator interposed therebetween and rolled up into a cylinder. An insulator was laid on the bottom of a battery case made of nickel-plated iron, and the cylinder was put therein. A nickel-made anode terminal was press bonded to the anode, and the other end of the terminal was welded to the battery case. An aluminum-made cathode terminal was attached to the cathode, and the other end of the terminal was electrically connected to a battery cap via a safety valve (thin plate for current cut-off).

A 1 mol/l electrolytic solution of $LiPF_6$ in the same mixed organic solvent as used in the test on flame retardancy was poured into the battery case and sealed with the cap to prepare a cylindrical nonaqueous secondary battery having a diameter of 18 mm and a height of 65 mm.

The resulting battery was subjected to a charge and discharge cycle test, in which the battery was charged at a constant current of 1A and a constant voltage of 4.2 V for 2.5 hours and discharged at a constant current of 1A to a final discharge voltage of 2.75 V. A percentage of the discharge capacity in the 100th cycle to that in the 2nd one was obtained as a capacity retention (%) and a percentage of the discharge capacity in the 2nd cycle to that of Comparative Example 1-1 was obtained as a 2nd cycle discharge capacity (%).

TABLE 1

| | Phosphorus Cpd. | | Burning Rate | Capacity Retention | 2nd cycle discharge |
|---|---|---|---|---|---|
| | Cpd. No. | X | (mm/sec) | (%) | capacity |
| Compara. Example 1-1 | — | — | 6.9 | 92.2 | 100 |
| Compara. Example 1-2 | A*1 | 1 | 1.2 | 69.9 | 94.7 |
| Compara. Example 1-3 | B*2 | 1 | 1.5 | 71.1 | 93.7 |
| Compara. Example 1-4 | C*3 | 1 | 1.1 | 69.4 | 94.7 |
| Example 1-1 | 1 | 1 | 0.0 | 86.2 | 98.9 |
| Example 1-2 | 1 | 2 | 0.0 | 84.5 | 96.8 |
| Example 1-3 | 2 | 1 | 0.0 | 85.2 | 96.8 |
| Example 1-4 | 2 | 2 | 0.0 | 82.7 | 96.0 |
| Example 1-5 | 3 | 1 | 0.0 | 85.3 | 97.6 |
| Example 1-6 | 3 | 2 | 0.0 | 83.2 | 97.9 |
| Example 1-7 | 4 | 1 | 0.0 | 84.5 | 95.8 |
| Example 1-8 | 4 | 2 | 0.0 | 82.9 | 94.7 |
| Example 1-9 | 7 | 1 | 0.0 | 89.4 | 98.9 |
| Example 1-10 | 7 | 2 | 0.0 | 87.2 | 96.8 |
| Example 1-11 | 9 | 1 | 0.0 | 88.9 | 97.9 |
| Example 1-12 | 9 | 2 | 0.0 | 86.5 | 97.4 |
| Example 1-13 | 10 | 1 | 0.0 | 89.2 | 98.4 |
| Example 1-14 | 10 | 2 | 0.0 | 87.0 | 96.8 |
| Example 1-15 | 11 | 1 | 0.0 | 81.3 | 94.4 |
| Example 1-16 | 11 | 2 | 0.0 | 80.5 | 94.1 |
| Example 1-17 | 12 | 1 | 0.0 | 82.6 | 95.6 |
| Example 1-18 | 12 | 2 | 0.0 | 81.8 | 95.2 |

Note:
*1: A: Dibutylethane phosphonate
*2: B: Dibutylbutane phosphonate
*3: C: Trimethyl phosphate As is apparent from the results in Table 1, the nonaqueous battery using an electrolytic solution containing no phosphorus compound (Comparative Example 1-1), while satisfactory in capacity retention, lacks flame retardancy, involving considerable danger of fire. The nonaqueous batteries using an electrolytic solution containing a phosphorus compound other than the compounds of the present invention (Comparative Examples 1-2 to 1-4) show some improvement in flame retardancy but still entail danger of fire and also undergo reduction in capacity retention due to addition of the phosphorus compound.

To the contrary, the nonaqueous secondary batteries of Examples 1-1 to 1-14, in which the phosphorus compound represented by formula (I) is added to the electrolytic solution, apparently exhibit not only a high capacity retention as battery performance but excellent flame retardancy, involving little danger of fire.

What is claimed is:

1. A flame-retardant electrolytic solution of an electrolyte salt in an organic solvent, wherein said organic solvent contains at least one phosphorus compound represented by formula (I):

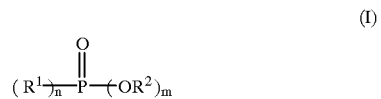

wherein $R^1$ represents an alkyl group having 1 to 8 carbon atoms, a halogenated alkyl group, an aryl group, an alkylaryl group, an aralkyl group or —$CH_2$—$COOR^3$; $R^2$ represents a methyl group, an ethyl group or a halogenated alkyl group having 1 to 8 carbon atoms; $R^3$ represents an alkyl group having 1 to 8 carbon atoms or a halogenated alkyl group; and m and n each represents 1 or 2 and the sum of m and n is 3.

2. The flame-retardant electrolytic solution according to claim 1, wherein $R^1$ is an alkyl group.

3. The flame-retardant electrolytic solution according to claim 1, wherein at least one of $R^1$, $R^2$, and $R^3$ is a halogenated alkyl group.

4. The flame-retardant electrolytic solution according to claim 1, wherein m is 2 and n is 1.

5. The flame-retardant electrolytic solution according to claim 1, wherein said organic solvent contains one or more solvents selected from the group consisting of carbonates, lactones, ethers, sulfolanes, and dioxolanes.

6. The flame-retardant electrolytic solution according to claim 1, wherein said electrolyte salt is an inorganic salt composed of a lithium ion and at least one anion selected from the group consisting of $PF_6$, $BF_4$, $ClO_4$, and $AsF_6$ or an organic salt composed of a lithium ion and at least one anion selected from the group consisting of $SO_3CF_3$, $N(CF_3SO_2)_2$, $C(CF_3SO_2)_3$, and a derivative thereof.

7. The flame-retardant electrolytic solution according to claim 1, wherein said phosphorus compound is present in the organic solvent in a proportion of 5 to 100% by weight.

8. A nonaqueous secondary battery comprising a cathode, an anode, a nonaqueous electrolytic solution, and a separator, wherein said nonaqueous electrolytic solution is a flame-retardant electrolytic solution of an electrolyte salt in an organic solvent containing at least one phosphorus compound represented by formula (I):

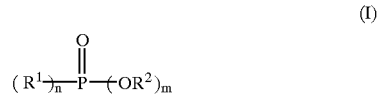

wherein $R^1$ represents an alkyl group having 1 to 8 carbon atoms, a halogenated alkyl group, an aryl group, an alkylaryl group, an aralkyl group or —$CH_2$—$COOR^3$; $R^2$ represents a methyl group, an ethyl group or a halogenated alkyl group having 1 to 8 carbon atoms; $R^3$ represents an alkyl group having 1 to 8 carbon atoms or a halogenated alkyl group; and m and n each represents 1 or 2 and the sum of m and n is 3.

* * * * *